Feb. 27, 1962    A. M. SEVERSON ETAL    3,023,294
CONTROL APPARATUS

Filed Feb. 2, 1959    3 Sheets-Sheet 1

INVENTOR.
ARLON D. KOMPELIEN
ASBJORN M. SEVERSON
BY
*Clyde C. Blinn*
ATTORNEY

Feb. 27, 1962 A. M. SEVERSON ETAL 3,023,294
CONTROL APPARATUS
Filed Feb. 2, 1959 3 Sheets-Sheet 2
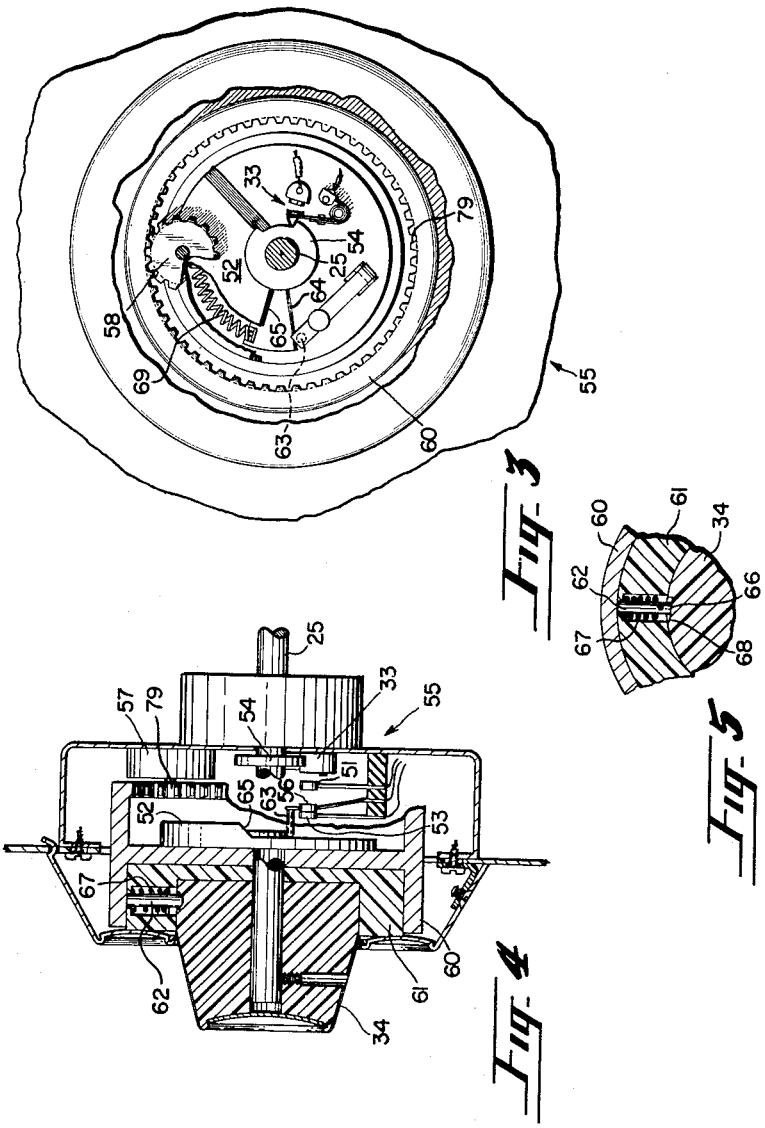
INVENTOR.
ARLON D. KOMPELIEN
ASBJORN M. SEVERSON
BY
Clyde C. Blinn
ATTORNEY

United States Patent Office 3,023,294
Patented Feb. 27, 1962

3,023,294
CONTROL APPARATUS
Asbjorn M. Severson and Arlon D. Kompelien, Minneapolis, Minn., assignors to Minneapolis-Honeywell Regulator Company, Minneapolis, Minn., a corporation of Delaware
Filed Feb. 2, 1959, Ser. No. 790,429
7 Claims. (Cl. 219—20)

The present invention is concerned with an improved control system; particularly, the system is for controlling the temperature warm up of a condition changing device having varying size loads.

With the application of automatic temperature control to surface burners on a range, the fact that varying loads are used from time to time poses numerous problems especially during the warm up or pick-up operation of temperature control systems. With a temperature sensor engaging the bottom of a pan on a surface burner of a range, the amount of anticipation needed in the control apparatus to which the sensor is connected changes with the amount of load on the burner. For a light load, a large amount of anticipation is necessary during warm up to prevent the burner from operating too long which results in an overshooting of the desired temperature. For a heavy load or filled pan, the amount of anticipation should be less to provide for maximum warm up as overshooting is less likely to occur.

Heretofore, in stove controls of this type where varying loads were experienced, the amount of anticipation in the control apparatus was selected for the average load. Obviously, a certain amount of overshooting might take place with light loads, and warm up will require a longer time for heavier loads.

The present invention senses the size of the load on the burner, and with each load, the correct amount of anticipation is used; so that, upon a change in the control point of the control apparatus, the warm up is accomplished in the minimum amount of time.

An object of the present invention is to provide an improved control system.

Another object of the present invention is to provide an improved temperature control system for providing maximum warm up regardless of the size of the load.

Another object of the present invention is to provide in control apparatus a means for sensing the load and adjusting the amount of operation of the condition changing apparatus; so that, a change in the level of condition desired can be accomplished with a minimum amount of overshooting.

These and other objects of the present invention will become apparent upon a study of the drawings of which:

FIGURE 3 is a rear cutaway view of part of the apparatus shown in FIGURE 1;

FIGURE 4 is a side cutaway view of the apparatus shown in FIGURE 3;

FIGURE 5 is an enlarged section of the pin shown in FIGURE 4;

Figure 1:
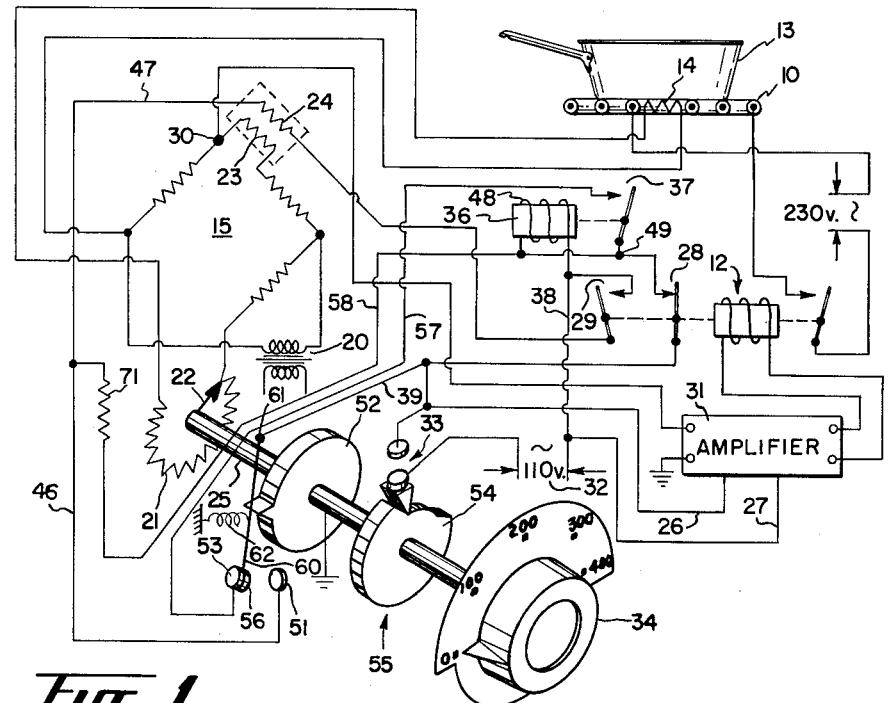
FIGURE 1 is a schematic representation of the control circuit of the present invention.

Referring to FIGURE 1, a burner 10 is shown connected to a source of power through a relay 12. For explanation purposes, the burner might be an electric surface burner on a domestic range for heating a load or the contents of a pan 13. Engaging the bottom of the pan is a temperature sensor 14; so that, as the temperature of the load on burner 10 changes, the resistance of the sensor varies.

A bridge circuit 15 of a conventional type has a power source 20. Connected in one leg of the bridge are sensor 14 and resistor 21 of a potentiometer having a wiper 22. The bridge has three other legs one of which is a temperature responsive resistor 23 thermally associated with a heater 24 for providing heat anticipation to the control apparatus. As wiper 22 is connected through an operating shaft 25 to ground, an output of bridge 15 is available between terminal 30 and ground, both of which are connected to an input of a conventional amplifier 31. Amplifier 31 receives power from a source 32 through a switch 33. The output of amplifier 31 controls relay 12 to energize heating element 10 through a normally open switch 16 to maintain the temperature of the load as selected by the position of wiper 22 on resistance 21 of the bridge circuit.

A control knob 34 is connected to shaft 25 to select the temperature or control point desired. Also connected to shaft 25 are cams 52 and 54. When shaft 25 is rotated clockwise, switch 33 is closed and the amplifier is energized by connecting power input connections 26 and 27 to source 32. At the same time, cam 52 is effective to move a movable contact 56 away from a fixed contact 53 to engage a fixed contact 51. Contact 56 is attached to member 60 which is pivotally supported at point 61. Member 60 is held against cam 52 by a spring 62. Relay 12 has a normally closed switch 28 and another normally open switch 29. A relay 36 has a normally open switch 37. An energizing winding 48 of relay 36 is connected across connections 26 and 27; so that, the relay is energized when switch 33 is closed. The energizing circuit is from connection 26, conductor 38, winding 48, switch 28, and back to connection 27. When switch 33 is closed, heater 24 is energized through a circuit traced as follows: Connection 27, a conductor 39, movable contact 56, fixed contact 51, a conductor 46, a conductor 47, heater 24, switch 29, conductor 38, and connection 26.

One side of the switch 37 is connected to a terminal 49 between winding 48 and switch 28. Another side of switch 37 is connected by conductor 57 to fixed contact 53. A circuit from contact 53 can be traced from the contact, through conductor 57, switch 37, switch 28, to the power connection through switch 33. The terminal 49 is connected by a conductor 58 to a resistor 71 which has its other end connected to the common connection of conductors 46 and 47.

Upon a change in the position of knob 34 to change the control point of bridge 15, some temperature anticipation in the bridge circuit 15 is desired to adequately change the temperature of pan 13 in the minimum amount of time. The size of resistor 23 and heater 24 could be selected to provide a certain amount of anticipation; however, the anticipation needed will vary with the size of the load on element 10. When the anticipation selected provides satisfactory control for a light load, the temperature increase upon a selected change is very slow for a heavy load. Using an example of the other extreme, a correct amount of anticipation for a heavy load results in considerable overshooting of the control point during the warm up operation for light loads. For a particular installation, the time period of continuous operation of element 10 upon a predetermined change in the control point setting must be determined by each load 13.

Figure 2:
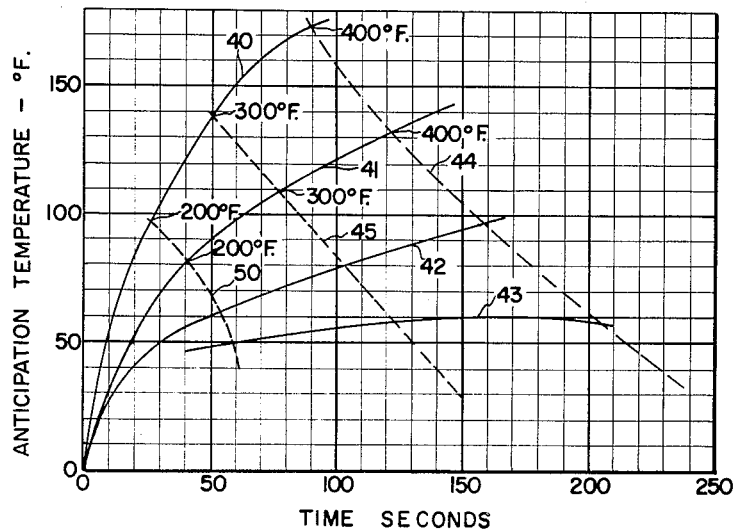
FIGURE 2 is a graphical representation of ideal operating characteristics of the present invention.

Referring to FIGURE 2, a graphical representation of the anticipation temperature in degrees Fahrenheit is shown as a function of time in seconds. The information shown on this curve was obtained in an experimental manner. A pan containing a predetermined amount of oil was placed on a surface burner. After a cold start, the burner was cut off or de-energized at a given time, and the peak pan temperature was noted as the set point. The same test was run for several loads.

The curves shown in FIGURE 2 and labeled 40, 41, 42 and 43 represent different loads. The load would be made up of the pan and the contents in the pan. Curve 40 was made with a quarter pound of cooking oil. The load was increased until finally curve 43 was made with one pound of cooking oil. While the particular load and the size of the pan contributes nothing to the invention, the operation and explanation of the invention will be more readily understood when it is explained with some specific data taken from actual test results.

The anticipation temperature is the temperature difference between the finally desired temperature and the cut-off temperature. For example, with the load shown in curve 40, the burner would be turned off after 50 seconds of operation. Fifty seconds of initial operation of burner 10 meets the requirements for a warm up in the shortest period to a finally controlled temperature of 300° F. The actual temperature of the pan at the 50 second cut-off period was approximately 139° below the 300° set point or finally desired temperature. The 139° is the anticipation temperature for that load. Other points on curve 40 were obtained. If a final temperature of 400° was desired for the same load, the burner would be cut off after 90 seconds of continuous operation when the pan or load temperature was approximately 173° below the 400° finally desired temperature. With the load of curve 42, the burner was operated continuously for approximately 103 seconds to obtain the maximum warm up to a final temperature of 300°. At the time of cut-off or 103 seconds of operation, the pan temperature was approximately 80° below the 300° finally selected temperature.

The ideal anticipation temperature curves 40, 41, 42 and 43 could be used to control the initial on-time of the burner if it were always known what size load was on the burner. While in the particular experimental test the load was known, and this, of course, would not be the case when any pan load was set on the burner. The problem can be resolved to the selection of the ideal anticipation curve for the particular load imposed upon the burner.

By drawing lines between the corresponding points on each of the ideal anticipation curves for the different loads, lines 44, 45 and 50 represent the 400, 300 and 200 degree set points for the various loads. After considerable study, the similarity between the curves 44, 45 and 50 and the normal decay temperature line of an element heated up along a curve such as 40 was recognized. When an element such as 23, as shown in FIGURE 1 in the bridge circuit, is heated by the application of voltage to heater 24, the change in resistance or output of the bridge circuit as affected by the element 23 might follow a line quite similar to curve 40 as shown in FIGURE 2. At some selected time depending upon the set point the addition of heat could be stopped by de-energizing heater 24. The resistance of element 23 would then begin to decay or drop. If we were to use a heating period such as the 50 second time in FIGURE 2 corresponding to the 300° F. set point, the change in resistance of element 23 would follow a line quite similar to curve 40. At the 50 second time, upon the de-energization of heater 24, the resistance of element 23 would fall or decay along a line similar to curve 45. The same result would take place upon the de-energization of the heater 24 for set points at 400° F. and 200° F. at times coinciding to the intersection of curves 44 and 50 with curve 40 or 90 and 26 seconds, respectively. It should, of course, be apparent that this anticipation heater cut-off time is a continuous variable with respect to set point so an infinite number of lines such as 44, 45 and 50 exist.

Figure 6:
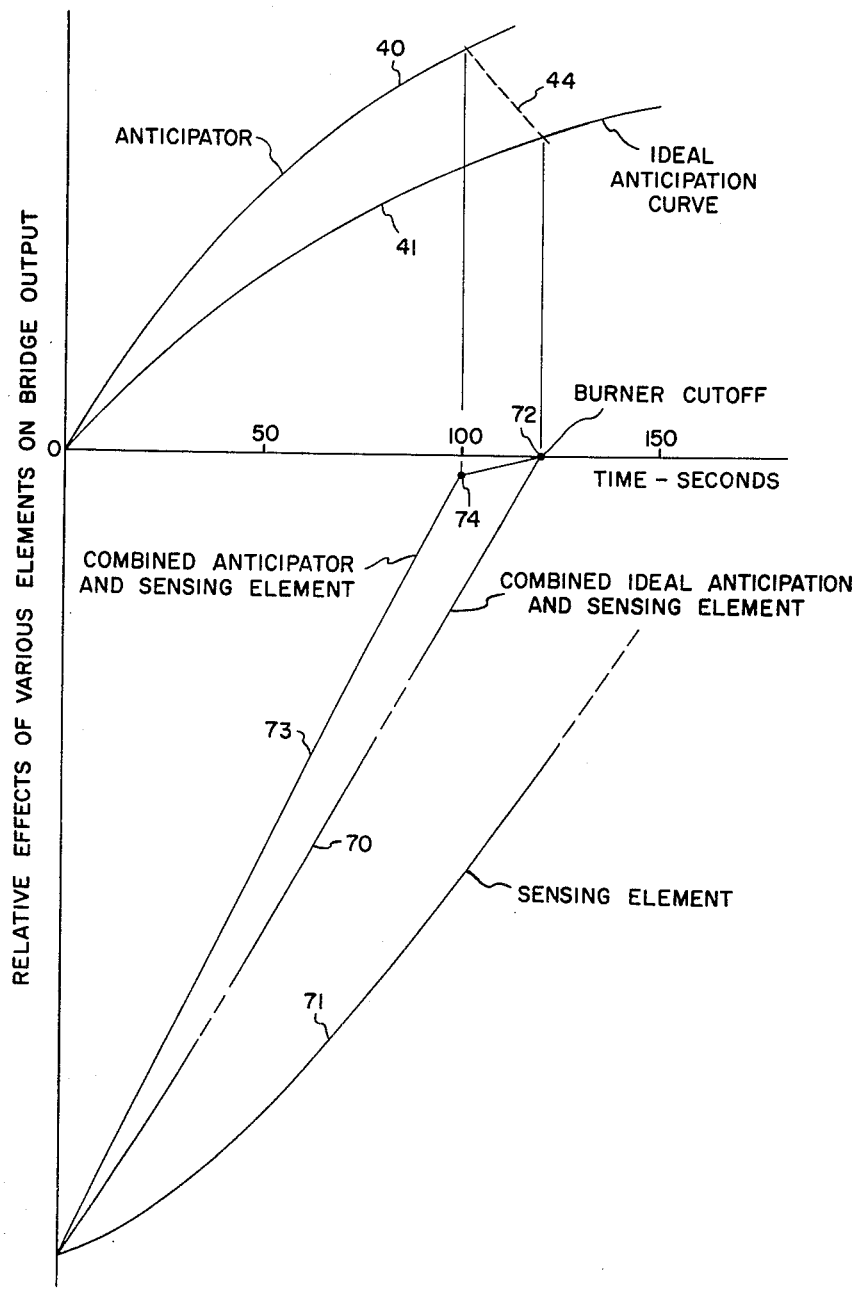
FIGURE 6 is a graphical representation of the operation of the present invention.

Referring to FIGURE 6, the application of the similarity of the curves of FIGURE 2 to the effect of resistor 23 in the circuit of FIGURE 1 is explained in more detail. The relative effects of various elements on the bridge output is plotted as a function of time in seconds. Since a curve is only for graphical representation purposes actual values are not shown for the ordinate. The relative effect of the elements on the bridge output might be plotted in terms of changes in resistance, changes in current, or changes in voltage whichever is best understood by the people involved. Whatever value is used for the ordinate is immaterial as the relationship of the various elements in obtaining a balance of the bridge 15 is to be desired. Assuming that the zero point on the ordinate is an approximate balance of bridge 15, the effect of resistance 14 and resistance 23 on the output of the bridge circuit must be such that for a given position of potentiometer 22, balance would be obtained and the heat up 10 is de-energized.

Plotted in FIGURE 6 above the abscissa are the curves corresponding to 40 and 41 in FIGURE 2. The curve 41 is the ideal anticipation curve for one particular load shown in FIGURE 2 which will be used for explanation purposes. If some output could be obtained similar to curve 41 to be balanced against the output of the sensing element 14, upon a warm up of the temperature of load 13, relay 12 would be de-energized at the proper time; so that, no overshooting and maximum warm up were attained. Plotted below the abscissa is a curve 70 representing the combined output of the ideal anticipation device or curve 41 and the output of the sensing element 14. Curve 71 is a representation of the output of the sensing element 14. Curve 70 is obtained by graphically adding curves 71 and 41. The burner cutoff time is shown at 72. If the burner is cut off at 72, the load temperature will coast up to the selected temperature which in this particular case is 400° F. as indicated by curve 44 in FIGURES 2 and 6. Ideally such an operation is fine. In order to select the burner cutoff at the time shown by point 72, the anticipator or resistance 23 is heated along a curve represented by 40 in FIGURE 6. At a time determined by the set point and shown by the intersection of curves 40 and 44, the anticipator heater 24 is de-energized; so that, the resistance 23 will cool down to balance the output of sensing element 14 and thus de-energize the relay 12 at the cutoff point 72. Curve 73 represents the combined effects of the anticipator 23 and the sensing element 14. This curve is obtained by graphically adding the outputs of the sensing element, curve 71, and the anticipator curve 40. The first part of curve 73 up to point 74 is obtained upon the rising effect of the anticipator or resistor 23. When heater 24 is de-energized and the effect of anticipator 23 begins to decrease along line 44, curve 73 will take a different slope until it reaches the cutoff point 72.

Upon a study of FIGURE 6, the need of an apparatus for duplicating the effects of FIGURE 6 for any load selected and thus any point on the curve of FIGURE 2 is seen. A device is needed which will switch heater 24 off at the appropriate time, depending upon the final control point selected to allow the anticipator resistor 23 to cool down along a curve similar to one of the curves 44, 45 or 50, shown in FIGURE 2. With such a device, regardless what the size of load 13 was; that is, whether it coincided with the curves 41, 42, or 43 or load in between curves 40 and 43, the heater 24 would be de-energized at a time depending upon the final point selected. The effect of resistor 23 as it cooled on the bridge circuit would be compared with the effect of resistor 14 on the bridge circuit until balance was established. The time of balance along the abscissa of FIGURE 6 would be the selected burner cutoff time to obtain maximum warm up without overshooting the selected control point.

To duplicate the characteristic curve shown in FIGURE 2, the apparatus 55 comprising cams 52 and 54 of FIGURE 1 might be as shown in FIGURES 3 and 4. Obviously, any other type of mechanism might be used to perform the particular schedule desired, but for explanation purposes, the mechanism of FIGURES 3 and 4 is disclosed. Referring to FIGURES 3 and 4, the selector knob 34 is shown connected to shaft 25. Cam 54 which is integral with shaft 25 controls the operation of switch 33. Upon rotating knob 34 clockwise in FIGURE 1 and to similarly rotate shaft 25 counterclockwise in FIGURE 3, switch 33 is closed. Rotatably mounted on shaft 25 is a member 60. A member 61 also rotatably mounted on shaft 25 is received by a sleeve of member 60. A portion of knob 34 is received by a sleeve of member 60. A pin 62, shown in more detail in FIGURE 5, is contained in member 61; so that, upon a clockwise rotation of knob 34, pin 62 is biased outward against member 60 to hold it as an integral part with member 61 and knob 34. Pin 62 has a lower end 66 cut off at an angle. Pin 62 is biased inward as shown in FIGURE 5 by a coil spring 67 against a sloping surface 68 on knob 34. When knob 34 is rotated clockwise as shown in FIGURE 5, pin 62 is forced upward by surface 68 against the inner surface of member 60. Thus knob 34, member 60, and member 61 are locked together to be rotated by knob 34 as an integral part. Upon the rotation of knob 34 to a new setpoint, member 60 and gear sector or rack 79 are also rotated. An escapement timer mechanism 57 which has a gear 58 attached thereto and engaging gear sector 79 is wound. When the set point is reached by knob 34, pin 62 retracts inward to allow member 60 to move freely with respect to knob 34 to return to its original position in a clockwise direction as shown in FIGURE 3, under the power of the escapement timer mechanism 57.

The cam 52 forms a part of member 60 and upon the counterclockwise rotation of member 60 in FIGURE 3, cam 52 is rotated. A cam rider 63 which is positioned by cam 52 carries movable contact 56 to engage either contact 51 or 53.

A retractable cam portion 64 is a part of cam 52. Member 64 can be urged into a slot of cam 52 compressing spring 69 when movable rider 63 engages the lower edge of member 64 as shown in FIGURE 3. Member 64 is then moved upward with respect to cam 52; so that, rider 63 is lifted by the sloping surface 65 of cam 52. As soon as the rider 63 is on the high portion of cam 52, spring 69 snaps member 64 out; so that, upon the return movement of the cam 52 in a clockwise direction as shown in FIGURE 3, rider 63 will first drop off cam 52 and onto member 64 to move contact 56 away from contact 51. Contact 56 does not engage contact 53 until a short period elapses and rider 63 drops off of the end of member 64.

Since the intent of the mechanism shown in FIGURES 3, 4, and 5 is to provide a time control for switching anticipation heater 24 in accordance with the time schedule to duplicate curve 40 of FIGURE 2, the length of cams 52 and 64 shown in FIGURE 3 must be properly selected. As the characteristic curve of FIGURE 2 is for a control system for one particular range, obviously where the size of the heater 10 is changed, the characteristics shown in FIGURE 2 would be different. The invention as described and shown must be tailor made to meet a particular range or device to be controlled; however, once the invention is understood by one skilled in the art, there would be no difficulty in adapting it to a particular heater or burner size.

Cam 52 must be so designed that upon the rotation of knob 34 to select some predetermined control point such as 300°, cam 52 would be advanced; so that, the heater 24 of the anticipation circuit in FIGURE 1 would be energized approximately 50 seconds as shown by the intersection of the 300° control point line 45 and curve 40 of FIGURE 2. When another temperature was selected such as 400° and shaft 25 was rotated to the 400° set point, cam 52 would move counterclockwise as shown in FIGURE 3 to a predetermined position. As the timer motor 64 returned the mechanism in a clockwise direction, rider 63 would not drop off of the edge 65 of cam 52 until 90 seconds had elapsed. Thus heater 24 would be energized for 90 seconds as determined by the intersection of the 400° set point line 44 and curve 40 in FIGURE 2.

*Operation*

As shown in FIGURE 1, the control system is in the off position with switch 33 open to de-energize the amplifier 31. Let us assume that a load 13 was placed on burner 10. Further let us assume that this load is of sufficient size that an ideal anticipation curve would be 41 in FIGURE 2. As far as the control system is concerned the size of the load 13 makes no difference; however, for explanation purposes, a load having the ideal anticipation curve 41 is selected. Assume that a control temperature of 400° is desired. Knob 34 is turned to the 400° setting. If the size of the load were always constant and known, the mechanism could be adjusted so that the initial on-time of burner 10 was approximately 120 seconds as determined by the intersection of curve 41 and the 400° set point line 44 as shown in FIGURE 2. To design the control system to match only curve 41 would be insufficient for greater or smaller loads. For the load selected, the initial burner on time of 120 seconds as shown in FIGURE 6 at 72 would be correct.

Heater 24 is energized for a time determined by the intersection of curve 40 and the control point setting or curve 44 for 400° as shown in FIGURE 2. Upon the rotation of knob 34 to the 400° set point, rider 63 as shown in FIGURES 3 and 4, causes cam 64 to retract into cam 62 until rider 63 moved up the sloping edge 65 and onto cam 52. As the knob 34 was rotated, member 60 would wind the time mechanism 57. At the 400° set point for knob 34, rider 63 would be on cam 52. Upon the clockwise movement of cam 52, as shown in FIGURE 3, under the power of mechanism 63, rider 63 would not drop off of the edge 65 of cam 52 until approximately 90 seconds had elapsed. After the 90 second energization period, heater 24 would be de-energized since contacts 56 and 51 would part. The combined output of the anticipator resistor 23 and the sensing element 14 as it affects the output of bridge 15 is shown as curve 73 in FIGURE 6. The output moves upward toward the zero output at which the relay 12 is de-energized and the burner cut off. Curve 73 is obtained by the addition of the effects of resistor 23 and sensing element 14 on the bridge circuit. When heater 24 is cut off and resistor 23 begins to cool along a line similar to 44 as shown in FIGURE 6, the slope of the combined output 73 changes until the output reaches the point 72. At this time, the bridge output is insufficient to maintain relay 12 energized, and the burner is cut off.

During the period when relay 12 is energized heater 24 is connected to source 32 through switch 29 and contacts 56 and 51. At the same time relay 36 is de-energized as switch 28 is open. When contact 56 moves away from contact 51 at the anticipation time at 74 in FIGURE 6, heater 24 is de-energized. When the bridge output becomes zero and the relay 12 is de-energized at 72 in FIGURE 6, the burner 10 is de-energized and relay 36 is energized through switch 28. Switch 37 connects heater 24 to be energized through resistor 71 at a lower heating level for normal anticipation; however, until relay 12 is again energized, switch 29 prevents the energization of heater 24.

When movable contact 56 engages contact 53, the circuit is ready for normal anticipation through resistor 71. A short period will elapse depending upon the length of cam 64 before contact 56 engages contact 53, so that, low heat anticipation will not be obtained when relay 12 is energized for the initial warm up. When the temperature of element 14 reaches a peak and begins to drop, the bridge output will energize relay 12 again. At this time, normal anticipation is accomplished through switch 29, and relay 12 will pulse off and on to maintain a selected temperature.

While the invention has been shown in one particular embodiment, the invention should be limited only by the scope of the appended claims in which we claim:

1. In a temperature control system for matching the warm up on-time of a heating element to a load on the heating element, a bridge circuit connected to a source of power, said bridge circuit having at least two legs, a first temperature responsive impedance adapted to respond to the temperature of said load, a resistance winding having a wiper for selecting the value of resistance used, said wiper being positioned by a temperature selector, means connecting said temperature responsive impedance and said winding in one leg of said bridge, a second temperature responsive impedance having a heater, means connecting said second impedance in a leg of said bridge opposite said one leg, relay means having an input circuit, means connecting second impedance and said wiper and thus an output of said bridge to said input circuit, means including said relay for selectively connecting said heating element to a source of power, timer operated switch means associated with said temperature selector, and means including said relay and said timer switch means for selectively connecting said heater to said source, said timer operated switch means providing a closed circuit for a predetermined period depending upon the magnitude of a change in position of said temperature selector so that said second impedance is heated a predetermined period to unbalance said bridge circuit maintaining said heating element energized and after said predetermined period said second impedance begins to decrease in value as it cools, said first impedance increases in value as said load increases in temperature until said bridge is balanced at which time said heating element is de-energized, and means responsive to the next energization of said heating element for reconnecting said heater to said source for normal operation.

2. In a temperature control system for matching the initial on-time of a heating element to a load to provide a maximum temperature warm up, first temperature responsive means responsive to the temperature of said load, second temperature responsive means, control circuit means adapted to control the energization of said heating element, means connecting said first and second responsive means to said control means, said second responsive means effecting said control means in the opposite sense to the effect of said first responsive means on said control means, means for artificially heating said second responsive means a first amount, timer means for controlling said artificial heating means so that a predetermined heating time is selected each time a predetermined adjustment of said control circuit means is made, said heating time being dependent upon the final temperature selected for said load, said second responsive means effects said control means in one sense during the selected artificial heating time to cause energization of the heating element and upon the termination of said time said output of said second means decreases to balance out the effect of said first responsive means to de-energize said control means to terminate the initial warm up heating of said load, and means for connecting said artificial heating means to said source for a second amount of heat upon the normal operation of said control means.

3. In a temperature control system for selecting the initial on-time of a heating unit to provide a fast warm up before the heating unit is placed on conventional control, first temperature responsive means responsive to the temperature of a load of said heating unit and having an output indicative of the load temperature, second temperature responsive means having an output indicative of its temperature, control means for controlling the operation of the heating unit to maintain a selected load temperature, means connecting said first and second responsive means to said control means, first means for heating said second responsive means for a selected period of time depending upon the desired final temperature of the load, said second responsive means offsetting the effect of said first responsive means while it is being heated so that said control means energizes the heating unit, said first responsive means increasing in output as the temperature of the load increases to offset said output of said second responsive means after said selected period as said second responsive means begins to cool off to decrease in output, and means for placing said first temperature responsive means in normal control of the heating unit a predetermined time after the fast warm up has been accomplished.

4. In a temperature control system for pre-heating a load to quickly bring the load up to temperature, a first temperature responsive means having a first output which changes with the temperature of a load, second temperature responsive means having a second output, control means adapted to control the supply of heat to the load, means connecting said first and second outputs to said control means, a temperature selector connected to said control means, a heater thermally associated with said second responsive means, a time controlled means for energizing said heater, said time means being adjusted upon a change in said temperature selector so said heater is energized a selected period depending upon the magnitude of said change, said outputs being in opposition so the heating of said second responsive means causes said second output to increase to overcome the effect of said first output to maintain a supply of heat to the load; however, after said time control means deenergizes said heater and said second responsive means cools, the effect of said first output will overcome said second output to cause said control means to terminate said supply of heat of the pre-heating operation and the temperature of the load will arrive at the temperature selected by said selector.

5. In a temperature control system for changing the temperature of a temperature conditioned load to a selected value in a minimum time, temperature responsive means responsive to the temperature of the load, control means for controlling a load temperature changing apparatus, means connecting said responsive means to said control means, selector means for selecting a control point temperature of said control means as the temperature at which said load is to be maintained, timer controlled means, means connecting said timer means to said control means, said timer means having a first operation which changes said control point a predetermined amount in a first sense to maintain continuous energization of said load temperature changing apparatus, said first operation being determined by the magnitude of the selected control point temperature for said load, said timer means having a second operation which changes said control point temperature in a sense opposite from said first sense, said apparatus being deenergized after a continuous operation when said control means is satisfied by said load temperature reaching said control point temperature.

6. In a temperature control system for increasing the temperature of an unknown load to a desired value in a minimum amount of time, temperature responsive means responsive to the temperature of the load, control means for controlling the supply of heat to said load, means connecting said temperature responsive means to said control means to control the temperature of the load at a desired value depending upon the temperature selected by a control point selector of said control means, timer means for increasing the control point of said control means for a selected period of time depending upon the change in the temperature selected by said selector, said timer means decreasing the control point of said control means in a reverse manner after said selected period has elapsed whereby as said control point decreases and the temperature of said temperature responsive means increases, said control means will terminate the supply of heat at a time depending upon the selected change of the load temperature by said control means and the thermal mass of the load.

7. In a temperature control system for increasing the temperature of an unknown load to a desired value in a minimum amount of time, temperature responsive means responsive to the temperature of the load, control means for controlling the supply of heat to said load, means connecting said temperature responsive means to said control means to control the temperature of the load at a desired value depending upon the temperature value selected with a control point selector of said control means, timer means connected to said control means for increasing the control point of said control means along a predetermined schedule for a selected period of time depending upon the magnitude of change in the temperature selected by said selector, said timer means decreasing the control point of said control means in a reverse manner along said schedule after said selected period has elapsed whereby as said control point decreases and the temperature of said temperature responsive means increases said control means will terminate the supply of heat at a time depending upon the selected temperature change of the control point of said control means and the thermal mass of the load, and means associated with said control means to thereafter control the temperature of the load at said selected control point temperature.

References Cited in the file of this patent

UNITED STATES PATENTS

| | | |
|---|---|---|
| 2,268,737 | Brown | Jan. 6, 1942 |
| 2,410,014 | Clark | Oct. 29, 1946 |
| 2,435,530 | Candor | Feb. 3, 1948 |
| 2,490,965 | Huck | Dec. 13, 1949 |
| 2,819,371 | Aldrich et al. | Jan. 7, 1958 |

OTHER REFERENCES

Wilson: Electronics; vol. 23, No. 12, Dec. 1950; pp. 84–87.